United States Patent Office 3,721,113
Patented Mar. 20, 1973

3,721,113
ROLLING OF LITHIUM
Boghos Karnig Hovsepian, Wilmington, Del., assignor to E. I. du Pont de Nemours and Company, Wilmington, Del.
No Drawing. Filed Aug. 23, 1971, Ser. No. 174,227
Int. Cl. B21b 45/00, 3/00; B23p 17/04
U.S. Cl. 72—46
11 Claims

ABSTRACT OF THE DISCLOSURE

A process for producing thin continuous lithium strips in thicknesses less than 0.40 cm. by cold rolling lithium metal while it is compressed between smooth surfaces of a solid polymeric composition which composition is nonreactive with lithium and has a critical surface tension of not over 46 dynes per centimeter at 20° C.

BACKGROUND OF THE INVENTION

(1) Field of the invention

This invention relates to a process for reducing the thickness of lithium metal by cold rolling it between solid polymeric composition surfaces to produce relatively thin lithium strips.

The rolled lithium strips are particularly useful as anodes in lightweight, compact, high energy density voltaic cells.

(2) Description of the prior art

Lithium anodes for high energy density cells are best fabricated from lithium in the form of sheets or strips. For compact lightweight cells and batteries, it is desired that such anodes be as thin as possible, for example 0.004 to 0.04 cm. thick.

The problems involved in the production of lithium strips of uniform and low thickness are, however, well-known to those skilled in the art. For example, lithium strips as thin as 0.025 to 0.04 cm. can be produced by extrusion but it is not considered practical to extrude them any thinner. It is also recognized that extruded lithium strips often lack the desired uniformity in thickness.

Rolling of lithium metal to form the desired lithium strips or sheets has been attempted but when lithium is rolled against a metal roller, it sticks to the metal of the roller. Thus rolling has not been used to commercially produce strip lithium by conventional rolling methods.

A process has now been discovered whereby lithium strips of the desired thickness and having the desired degree of uniformity can be formed by rolling without giving rise to the problem of sticking.

SUMMARY OF THE INVENTION

A process for reducing the thickness of lithium metal which comprises compressively cold rolling lithium metal between substantially smooth solid polymeric composition surfaces. The solid polymeric composition utilized in the smooth surface is nonreactive with lithium and has a critical surface tension of not over 46 dynes per centimeter at 20° C.

DESCRIPTION OF THE INVENTION

Lithium metal can be cold rolled into sheets of even thickness by compressively rolling the lithium between substantially smooth surfaces of a solid polymeric composition which is nonreactive with lithium and has a critical surface tension of not over 46 dynes per centimeter at 20° C. By this process sticking of lithium to a metal surface, such as of a metal roller, is avoided and lithium strips of even thickness are obtained even down to thicknesses as low as 0.004 cm. The actual rolling conditions, e.g., compressive pressure, roller diameter, will depend upon the thickness of the strip desired and the form of the starting lithium metal. These conditions can then be readily determined and established by one skilled in the art.

The substantially smooth surface of the solid polymeric composition can be provided in a variety of ways, e.g., the lithium metal may be completely enclosed or faced on opposite sides with a polymeric sheet material and the lithium metal so enclosed or faced can be cold rolled between rollers, or the roller surfaces themselves may be faced or covered with the solid polymeric composition. As roller surfaces, the polymeric composition can be a friction-fit sleeve over a conventional roller, can be keyed to peripheral grooves parallel to the axis of a conventional roller, or the whole roller can be made of the polymeric composition.

Generally the lithium metal will be reduced in thickness by compression in a single pass through the rollers by 10 to 90% of its original thickness. Reductions of 20 to 50% are preferred for final stages of thickness reduction.

Temperature rises in rollers during compression can be controlled by means known in the art, for example by cooling the rollers internally. For extended rolling operation temperature rise can be minimized by using rollers having diameters which are 10 to 150, preferably 40 to 100, times the mean square of the entry and exit thicknesses of lithium passing between them.

Purity of lithium sheet exiting from compressive rollers is dependent on the ambient atmosphere in which compression is effected. While some thicknesses of lithium produced are negligibly affected in utility by surface reaction products with oxygen, nitrogen, carbon dioxide or especially water vapor, it is preferred to compress in the absence of contact with such vapors. Operation in a dry atmosphere of an inert gas, such as helium or argon, avoids the formation of surface reaction products.

Rolling with an essentially complete enclosure of lithium with polymeric sheet material as defined above also minimizes the presence of surface lithium reaction products.

The polymeric composition used to contact the lithium is solid in the temperature range of the compressing or rolling operation. Its melting temperature should be at least about 50° C. and preferably at least about 70° C. It should be unreactive with lithium at the operating temperatures. Preferably the composition should have at least the tensile strength of polyethylene.

The surface of the solid polymeric composition should be substantially smooth and should have a critical surface tension of not above 46 dynes per centimeter as determined by advancing contact angles. By substantially smooth, as used herein, is meant that asperities of the surface are not above 1 micron in height and are preferably less than 0.5 micron in height. The height of asperities can readily be determined by a scanning electron microscope. When the composition has such a low critical surface tension along with the lithium nonreactivity, lithium will not stick to it under the conditions of compressive rolling.

The critical surface tension for spreading defines the wettability of a solid surface by designating the highest surface tension a liquid in contact with the surface can have and still exhibit a contact angle of zero degrees on that solid. The critical surface tension is expressed in dynes per centimeter with a temperature designation. For purposes of this invention, a temperature designation of 20° C. is used.

The critical surface tension of a surface, as the term is used herein, can be determined by a sequence of operations involving determining the contact angles ($\theta$)

with the solid surface of a series of nonsolvent liquids of known surface tension, plotting the cosines of the contact angles against the surface tensions of the liquids and extrapolating the line of plots to the intercept with cosine $\theta=1$. The value at that intercept is defined as the critical surface tension of the surface. This value is independent of the nature of the test liquids and is a parameter characteristic of the solid surface only. For this invention, the methods and apparatus for determining contact angles between a liquid and the solid surface being tested are described in Contact Angle, Wettability and Adhesion, Advances in Chemistry Series 43 on page 137 in an article by R. H. Dettre and R. E. Johnson, Jr.

Solid polymeric compositions useful in the process of this invention can be polymers of compounds with polymerizable double bonds and condensation polymers of condensable compounds.

Useful polymers of compounds with polymerizable double bonds may be selected from polymers of ethylenically unsaturated hydrocarbons having 2 to 12 carbons, such as ethylene, propylene, n-hexylene, n-dodecene or 4-tert butylstyrene and of vinyl ethers such as methyl or ethyl vinyl ether. Preferred among these compounds are polyethylene and polypropylene due to their low cost.

Copolymers of the above monomeric compounds are also useful compositions so long as they meet the nonreactivity and critical surface tension requirements already discussed.

Useful condensation polymers may be selected from self-condensates of omega-amino-fatty acids and their lactams, such as condensation polymers from caprolactam and from 11-amino-undecanoic acid.

The condensation polymers can be polyamides of diamines having 6 to 9 carbons and dicarboxylic acids having 6 to 10 carbons. Typical useful diamines include hexamethylenediamine, nonamethylenediamine and aryldiamines such as m- and p-phenylenediamine. Typical useful dicarboxylic acids include adipic acid, suberic acid, azelaic acid, terephthalic acid and isophthalic acid. The preferred polyamide is the condensate of hexamethylenediamine and adipic acid, for reasons of general availability.

The condensation polymers can also be selected from polyesters of aryldicarboxylic acids such as phthalic, terephthalic and isophthalic acids and glycols having 2 to 6 carbons, such as ethylene-, butylene- and hexyleneglycols.

Useful solid polymeric compositions are given below with their known critical surface tensions ($V_c$) at 20° C. in dynes per centimeter.

| Composition: | $V_c$, 20° C. dynes/cm. |
|---|---|
| Poly(2-methylpropene) | +27 |
| Polypropylene | +29 |
| Polyethylene | +31 |
| Poly(4-tert-butylstyrene) | +29 |
| Polystyrene | +36 |
| Poly(vinyl methyl ether) | °29 |
| Poly(6-aminocaproic acid) | +42 |
| Poly(11-aminoundecanoic acid) | °33 |
| Poly(ethyleneterephthalate) | +43 |
| Poly(decamethylene sebacamide) | °32 |
| Poly(heptamethylene pimelamide) | °43 |
| Poly(octamethylene suberamide) | °34 |
| Poly(nonamethylene azelaamide) | °36 |
| Poly(hexamethylene adipamide) | +46 |

+ L. H. Lee, Journal of Applied Polymer Science 12, 719–730 (1968).
° E. G. Shafrin, Polymer Handbook, Interscience Publishers (1966), pages 111–113 and 114.

Lithium metal can be reduced in thickness from any convenient starting form, such as bar, rod, strip or sheet form. Prior art methods of extrusion may first be used to reduce lithium thickness to about 0.075 cm. The method of this invention may then be employed to produce thinner lithium of even thickness such as is required for thin anode material of voltaic cells. Lithium metal for anode use in voltaic cells should have an even thickness in the range 0.004 to 0.04 cm., preferably in the range 0.008 to 0.02 cm.

However, there is an advantage in reducing even thick lithium, e.g., 10 cm. thick, by the method of this invention. The avoidance of lithium sticking on compressive rollers makes feasible the adaptation of conventional metal rolling technology, with its relative economy, to reduction of all thicknesses of lithium.

Thinned lithium which exits from compressive rollers can be collected on a roll for later use or it can be cut into lengths as formed. The evenness of the thinned lithium can be assisted by drawing the lithium after exit between another pair of rollers, prior to its use or collection. Lithium while passing through these rollers should also be between surfaces of the previously defined solid polymeric composition.

If it is desired that the lithium metal be combined with another metal and rolled into strips of combined metals, the lithium metal can be compressed against a metal sheet or into a metal screen by positioning a layer of lithium against a metal sheet, e.g., of steel, or metal screen, e.g., of iron or nickel, and passing the combination through thickness reducing compressive rollers having a smooth surface of a previously discussed solid polymeric composition to which lithium does not stick.

EXAMPLES

The following examples are intended to be merely illustrative of the invention and not in limitation thereof. Unless otherwise indicated, all quantities are by weight.

Example 1.—Lithium rolling and thickness reduction between polyethylene sheets

An extruded lithium strip, about 0.038 cm. thick, was enclosed by dry polyethylene sheeting 0.08 cm. thick inside a drybox. The enclosed lithium sheet was laid on a flat metal plate and rolled down to a thickness of 0.020 cm. by reciprocating a metal roller 5 cm. in diameter over it.

The polyethylene sheeting peeled off the rolled lithium strip without sticking to it.

Example 2

Example 1 was repeated but the enclosed lithium strip was rolled down to a thickness of 0.015 cm. Again, the polyethylene sheets could be peeled from the rolled lithium strip without sticking.

Example 3.—Lithium rolling and thickness reduction with polypropylene rollers

A lithium metal strip about 0.035 cm. thick was rolled down to 0.013 cm. thickness by passage through a pair of driven polypropylene rollers 5 cm. in a diameter. The lithium and rollers were enclosed by a drybox. The lithium did not stick to the rollers and was suitable for immediate use as an anode preparation material.

Example 4.—Lithium rolling and thickness reduction with nylon rolls

Inside a drybox, an extruded lithium strip about 0.035 cm. thick was entered between driven rollers of nylon 66, poly(hexamethylene adipamide), having diameters of 7.5 cm., and spaced apart so that the lithium strip was reduced in thickness by 10% and then exited from the rollers during each pass through the rollers. Lithium strips with uniform 0.013 cm., 0.010 cm. and 0.0075 cm. thicknesses were obtained in a series of successive thinning passes through the rollers. The strips obtained did not adhere to the rollers and were suitable for immediate use as anode material.

Example 5.—Lithium sheet as voltaic cell anode

A 60 mg. sheet of 0.020 cm. thick lithium from Example 1 was incorporated as anode into a voltaic cell. A separating layer of paper tissue was interposed between the anode and a cathode of comparable area. The cathode was composed of iron sulfide cold pressed into aluminum foil. The electrolyte (0.3 ml.) consisted of 80% by weight methyl acetate and 20% by weight dissolved lithium hexafluorophosphate. This cell delivered current through a 125 ohm resistance during the 5 minutes when it was tested.

Example 6.—Lithium sheet as voltaic cell anode

A voltaic cell was fabricated by pressing together the following layers in the sequence:

(1) An anode of 0.0038 cm. thick lithium sheet made by the procedure of Example 1, (2) A paper tissue separator 0.01 cm. thick and (3) A cathode of particulate copper sulfide cold-pressed into lead foil.

The amount of lithium used was 70% of the electrochemical equivalent of the copper sulfide used.

These three layers were pressed together between flat nickel plates which were insulated from each other, and an electrolyte was absorbed into the tissue separator. The electrolyte consisted of 10 weight parts lithium perchlorate in 90 weight parts of a mixture by weight of 75% tetrahydrofuran and 25% glycol dimethyl ether.

The cell was discharged at 600 ohm load until voltage fell to 1.0 volt. The discharge energy showed that 94% of the lithium was utilized. This indicates the evenness of the original lithium sheet thickness.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A process for reducing the thickness of lithium metal which comprises compressively cold rolling the lithium metal between substantially smooth surfaces of a solid polymeric composition which polymeric composition is nonreactive with lithium and has a critical surface tension no greater than 46 dynes per centimeter at 20° C. as determined by advancing contact angles.

2. A process according to claim 1 wherein the lithium metal is first faced on opposite sides with sheets of the polymeric composition and then passed through compressive rollers.

3. A process according to claim 1 wherein the lithium metal is passed through compressive rollers which are faced with the polymeric composition.

4. A process according to claim 1 wherein the lithium metal is passed through compressive rollers which are made of the polymeric composition.

5. A process according to claim 1 wherein the polymeric composition is selected from the group consisting of ethylenically unsaturated hydrocarbons having 2 to 12 carbon atoms, condensation polyamides of diamines having 6 to 9 carbon atoms and condensation polyamides of dicarboxylic acids having 6 to 10 carbon atoms.

6. A process according to claim 2 wherein the polymeric composition is polyethylene.

7. A process according to claim 3 wherein the compressive rollers are enclosed by a friction-fit sleeve of the polymeric composition.

8. A process according to claim 7 wherein the friction-fit sleeve is a polyethylene or polypropylene sleeve.

9. A process according to claim 4 wherein the polymeric composition is the condensate of hexamethylenediamine and adipic acid.

10. A process according to claim 1 wherein the thickness of the lithium metal is reduced to about 0.004 to 0.04 cm.

11. A process according to claim 10 wherein the thickness of the lithium metal is reduced to about 0.008 to 0.02 cm.

References Cited

UNITED STATES PATENTS

| | | | |
|---|---|---|---|
| 712,365 | 10/1902 | Dejey | 72—700 |
| 1,516,098 | 11/1924 | Heyer | 72—700 |
| 2,120,461 | 6/1938 | Copeman | 72—46 |
| 3,147,546 | 9/1964 | Bowman et al. | 29—424 |
| 3,191,286 | 6/1965 | Armstrong et al. | 29—424 |
| 3,279,234 | 10/1966 | Ames | 72—366 |
| 3,358,355 | 12/1967 | Youssi et al. | 29—424 |

FOREIGN PATENTS

| | | | |
|---|---|---|---|
| 3,816 | 4/1963 | Japan | 29—423 |
| 1,478,257 | 5/1966 | France | 72—365 |

RICHARD J. HERBST, Primary Examiner

E. M. COMBS, Assistant Examiner

U.S. Cl. X.R.

29—424; 72—365, 366, 700

PO-1050
(5/69)

UNITED STATES PATENT OFFICE
CERTIFICATE OF CORRECTION

Patent No. 3,721,113      Dated March 20, 1973

Inventor(s) BOGHOS KARNIG HOVSEPIAN

It is certified that error appears in the above-identified patent and that said Letters Patent are hereby corrected as shown below:

Claim 5, Column 6, line 13, delete "condensation polyamides of"

Signed and sealed this 25th day of December 1973.

(SEAL)
Attest:

EDWARD M. FLETCHER, JR.　　　　　RENE D. TEGTMEYER
Attesting Officer　　　　　　　　Acting Commissioner of Patents